United States Patent [19]
Ooya et al.

[11] 3,798,556
[45] Mar. 19, 1974

[54] METHOD FOR DETECTING MUTUAL HIGHER AND LOWER REVOLUTIONAL SPEEDS OF A PLURALITY AMONG ROTATING MEMBERS

[75] Inventors: Junichiro Ooya; Katsuki Takayama; Kazutaka Kuwana, all of Kariya, Japan

[73] Assignee: Aisen Seiki Kabushiki Kaisha, Kariya City, Japan

[22] Filed: Dec. 15, 1971

[21] Appl. No.: 208,149

[30] Foreign Application Priority Data
Dec. 15, 1970 Japan.............................. 45-112234
Dec. 15, 1970 Japan.............................. 45-112235

[52] U.S. Cl................. 328/133, 307/215, 307/268, 307/233
[51] Int. Cl. ........................................... H03d 13/00
[58] Field of Search ............ 328/133, 134; 307/233, 307/215, 268

[56] References Cited
UNITED STATES PATENTS
3,069,623  12/1962  Murgio ........................... 328/134 X
3,233,180  2/1966  Eddy .................................. 328/134
3,441,342  4/1969  Ball et al.......................... 328/134 X
3,588,710  6/1971  Masters.............................. 328/133
3,514,705  5/1970  Feigleson........................... 328/133
3,501,701  3/1970  Reid................................... 328/134
3,515,997  6/1970  Babany .............................. 328/134
3,521,174  7/1970  Naubereit ...................... 328/134 X Primary Examiner—John S. Heyman
Attorney, Agent, or Firm—Sughrue, Rothwell, Mion, Zinn & Macpeak

[57] ABSTRACT

A method and apparatus for determining the relationship of the speed of rotation of two members in which one member rotates at a greater speed than the other. A series of pulses proportional to the speed of rotation of each member are generated and applied through a logic circuit to a bistable circuit. The logic circuit is such that it switches the state of the bistable circuit upon the occurrence of a rising edge (or falling edge) of one pulse in the first series followed by a rising edge (or falling edge) of a pulse in the second series.

6 Claims, 13 Drawing Figures

FIG. 3
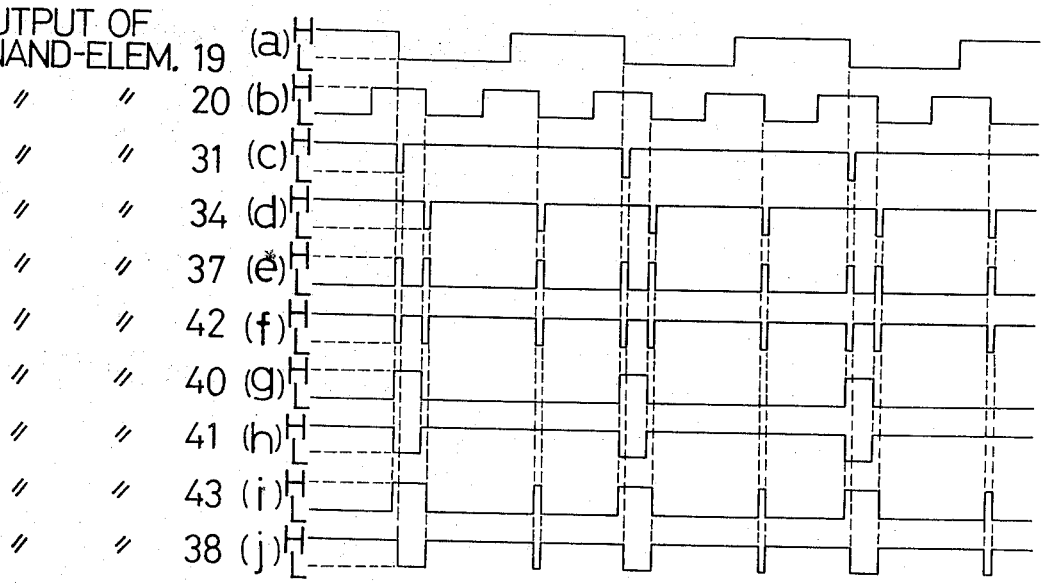
FIG. 5
FIG. 10
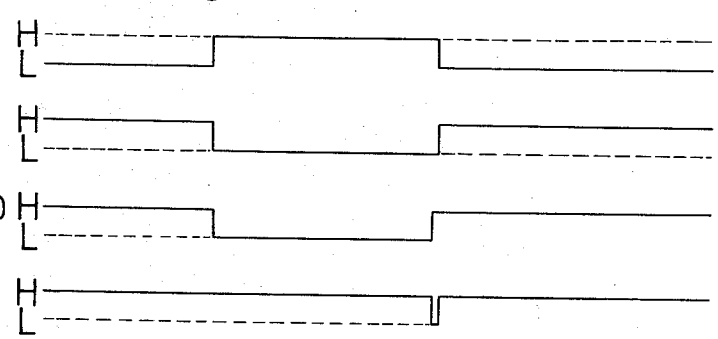

| INPUT | | | OUTPUT |
|---|---|---|---|
| $X_1$ | $X_2$ | $X_3$ | Y |
| H | H | H | L |
| H | H | L | H |
| H | L | H | H |
| H | L | L | H |
| L | H | H | H |
| L | H | L | H |
| L | L | H | H |
| L | L | L | H |

OUTPUT OF NAND-ELEMENT 19
" " 20
" " 31
" " 34
" " 40
" " 41

OUTPUT OF NAND-ELEMENT 19
" " 20
" " 31
" " 34
" " 40
" " 41

| | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| FLIP-FLOP 101 | Q-TERM. | L | H | L | H | L | H | L | H | L | H | L | H | L | H | L | H |
| | Q̄- " | H | L | H | L | H | L | H | L | H | L | H | L | H | L | H | L |
| FLIP-FLOP 102 | Q- " | L | L | H | H | L | L | H | H | L | L | H | H | L | L | H | H |
| | Q̄- " | H | H | L | L | H | H | L | L | H | H | L | L | H | H | L | L |
| FLIP-FLOP 105 | Q- " | L | L | L | L | H | H | H | H | L | L | L | L | H | H | H | H |
| | Q̄- " | H | H | H | H | L | L | L | L | H | H | H | H | L | L | L | L |
| FLIP-FLOP 107 | Q- " | L | L | L | L | L | L | L | L | H | H | H | H | H | H | H | H |
| | Q̄- " | H | H | H | H | H | H | H | H | L | L | L | L | L | L | L | L |

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| Q-TERMINAL OF FLIP-FLOP 109 | L | H | L | H | L | H | L | H | L | H | L | H | L | H | L | H |
| " " 110 | L | L | H | H | L | L | H | H | L | L | H | H | L | L | H | H |
| " " 111 | L | L | L | L | H | H | H | H | L | L | L | L | H | H | H | H |
| " " 112 | L | L | L | L | L | L | L | L | H | H | H | H | H | H | H | H |

| | NAND-ELEMENT 104 | | | | NAND-ELEMENT 103 | | | | NAND-ELEMENT 106 | | | |
|---|---|---|---|---|---|---|---|---|---|---|---|---|
| | IN-PUT | | OUT-PUT | | IN-PUT | | OUT-PUT | | IN-PUT | | OUT-PUT | |
| 0  | H | H | H | H | L | L | H | H | H | H | H | L |
| 1  | L | H | H | H | H | H | H | H | L | H | H | H | L |
| 2  | H | L | H | H | H | L | L | H | H | H | L | H | H |
| 3  | L | L | H | H | H | H | L | H | H | H | L | H | H |
| 4  | H | H | L | H | H | L | H | L | H | H | H | L | H |
| 5  | L | H | L | H | H | H | H | L | H | H | H | L | H |
| 6  | H | L | L | H | H | L | L | L | H | H | L | L | H |
| 7  | L | L | L | H | H | H | L | L | H | H | L | L | H |
| 8  | H | H | H | L | H | L | H | H | L | H | H | H | L |
| 9  | L | H | H | L | H | H | H | H | L | H | H | H | L |
| 10 | H | L | H | L | H | L | L | H | L | H | L | H | L |
| 11 | L | L | H | L | H | H | L | H | L | H | L | H | L |
| 12 | H | H | L | L | H | L | H | L | L | H | H | L | L |
| 13 | L | H | L | L | H | H | H | L | L | H | H | L | L |
| 14 | H | L | L | L | H | L | L | L | L | H | L | L | L |
| 15 | L | L | L | L | H | H | L | L | L | H | L | L | L |

METHOD FOR DETECTING MUTUAL HIGHER AND LOWER REVOLUTIONAL SPEEDS OF A PLURALITY AMONG ROTATING MEMBERS

This invention relates to a method for detecting mutual higher and lower revolutional speeds of a plurality of rotating members.

A generally prevailing method for the above kind purpose, especially based upon the analogue principle and using an electronic circuit, a so-called F-V converter is used by which the respective revolutions or frequencies of the rotating members are converted into corresponding higher and lower voltages and then, these are compared with each other for detecting the relative revolutional relationship among the rotating members. In the case of digital type, means are provided for counting members of revolution-responsive pulses delivered from respective sensing means attributed to the revolving members during a certain specified time interval, as determined by regularly delivered clock pulses from a certain origin serving for this purpose, and then the thus sensed revolution-responsive pulses are compared with each other for determining the mutual higher and lower revolutional relationship among the revolving members.

However, it is acknowledged that when relying upon these conventional methods, means for sensing the respective revolutional speeds of the rotating members must necessarily be provided which invites a highly complicated design and arrangement of the electronic circuit components, in addition of an inferior response and a highly increased manufacturing cost.

It is the main object of the present invention to provide a method for the above purpose, capable of obviating the aforementioned conventional draw-backs. More specifically, the object is to provide a method of the above purpose which is capable of dispensing with the means for determination of the respective revolutional speeds of the rotating members and which is well adapted for the determination of the desired mutual speed relationship.

This and further objects, features and advantages of the invention will become more apparent when read the following detailed description of the invention by reference to the accompanying drawings illustrative of several preferred embodiments of the invention.

In the drawings:

FIGS. 2 and 3 are explanatory diagrams for clarifying the operation of main parts included in the electronic circuit shown in FIG. 1.

FIG. 5 is an explanatory chart showing several succeeding shaping and processing the output from a revolution sensor means shown in FIG. 1.

FIG. 10 is an illustrative wave diagram of several flip-flops and NAND-elements shown in FIG. 6.

Figure 1:
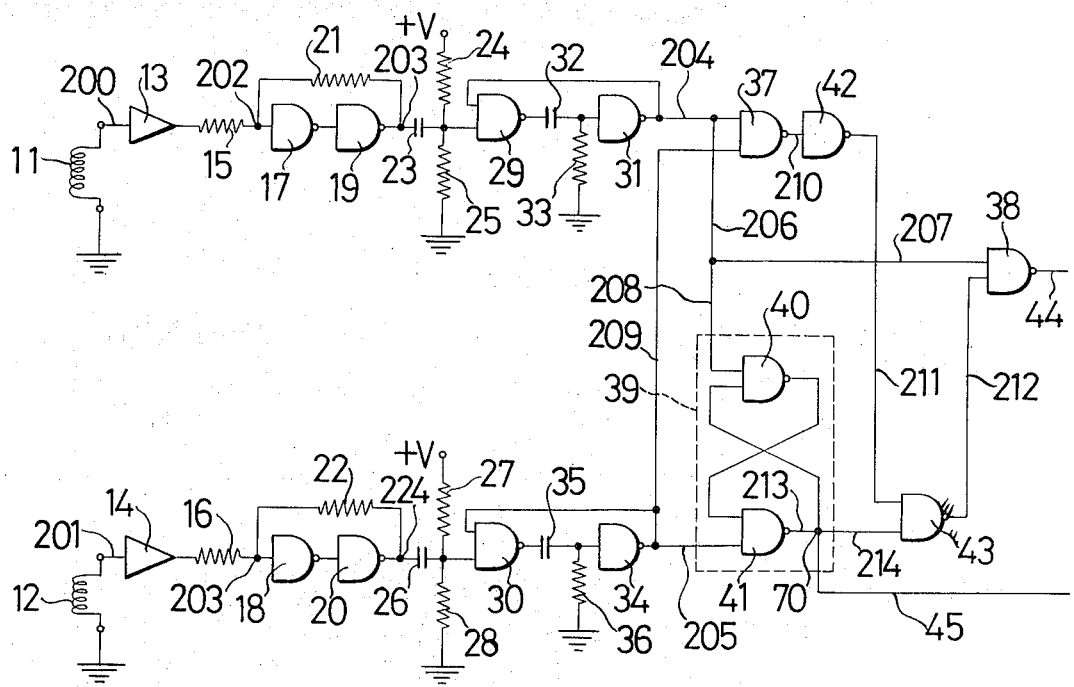
FIG. 1 is a schematic circuit diagram embodying basic principles of the method according to this invention.

Referring now to the accompanying drawings, numerals 11 and 12 represent two separate sensors coupled with respective rotating members, not shown, each of which is designed and arranged to deliver a plurality of pulses or sine waves per unit of time, in response to occasional and variable rotational speed of the related rotating member, such as, preferably, an automotive wheel. This sensor may be of conventional design of photo-electric, electromagnetic or the like nature. Or alternatively, it may comprise microswitch means as known per se. Numerals 13 and 14 represent amplifiers connected through lead means 200 and 201, respectively, with the outputs of said sensors 11 and 12; each of said amplifiers may be of the conventional design and an operational amplifier, a linear IC-amplifier, a transistor amplifier or the like. These amplifiers are connected through resistors 15 and 16 to NAND-elements 17 and 18, respectively, and thence to further NAND-elements 19 and 20, respectively. A resistor 21 or 22 is connected across the series-connected NAND-elements 17;19 or 18;20 through junction points 202 and 223 or 203 and 224, respectively.

Said resistors 15 and 21 and NAND-elements 17 and 19 constitute in combination a wave shaper circuit known per se. In the similar way, resistors 16 and 22 and NAND-elements 18 and 20 constitute in combination a further wave shaper circuit.

Condenser 23 and resistors 24 and 25 connected with each other as shown, to constitute a differentiating circuit known per se. In the similar way, condenser 26 and resistors 27 and 28 are connected with each other as shown, so as to provide a differentiating circuit.

The respective outputs of said NAND-elements 19 and 20 are conveyed through said respective wave shaping circuit and differentiating circuit to respective inputs of NAND-elements 29 and 30, respectively.

NAND-element 31, condenser 32, resistor 33 and NAND-element 29 connected with each other as shown and provide in combination a mono-stable multivibrator known per se. In the similar way, NAND-element 34, condenser 35 and resistor 36 and NAND-element 30 are connected with each other as shown, so as to provide again a mono-stable multi-vibrator. Output of NAND-element 31 is connected through lead 204 to an input of NAND-element 34, and through leads 206 and 207 to an input of NAND-element 38, and further through lead 208 to an input of NAND-element 40 included a flip-flop circuit 39.

Output of NAND-element 34 is connected through lead 209 to the other input of NAND-element 37 and through lead 205 to an input of NAND-element 41 which is contained in the flip-flop circuit 39.

Output of NAND-element 37 is through lead 210 to the input of NAND-element 42 the output of which is connected through lead 211 to an input of NAND-element 43. The other input of the element 38 is connected through lead 212 to the output of NAND-element 43. Output of NAND-element 41 is connected through lead 213, junction 70 and lead 214 to the remaining input of element 43.

As will be more fully described hereinafter, the higher revolutional signal coming from either sensor 11 or 12 appears always appear at the output 44 of NAND-element 38, while, at the output 45 of NAND-element 41, lower speed-responsive signal will always appear.

The operation of the circuit shown in FIG. 1 and described so far will be given in detail hereinbelow by reference to further figures.

Figure 4:
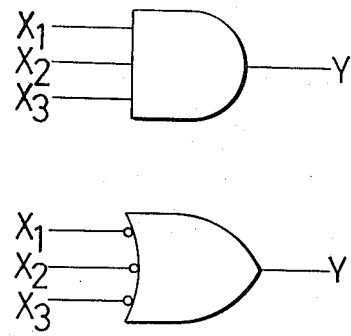
FIG. 4 is a table of truth values of NAND-elements employed in the circuit shown in FIG. 1.
Figure 12:
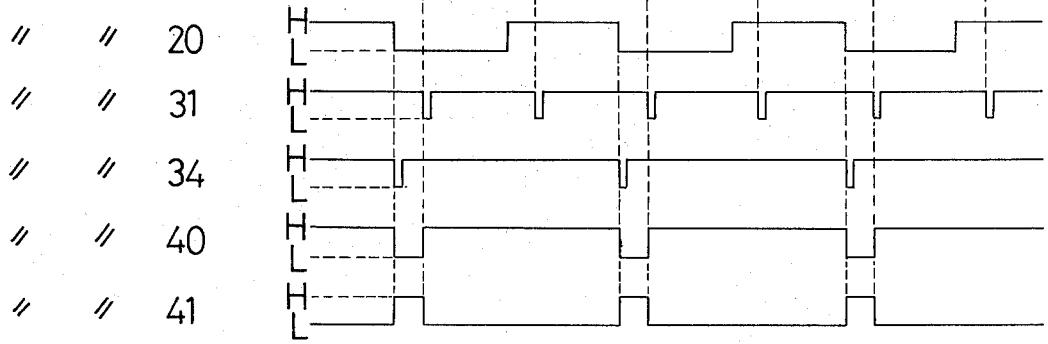
FIGS. 12 and 13 are two explanatory charts for the illustration of working modes of several circuit elements shown in FIG. 11.
Figure 13:
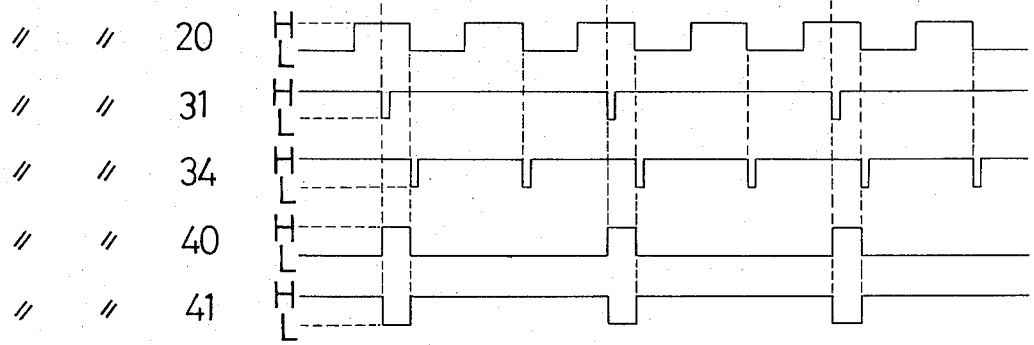

The performance of the NAND-element is illustrated representatively at FIG. 4. As seen, a binary output "L" is obtained with all the inputs fed with other binary signal "H". When at least one input signal is L, then the output will be H.

Revolution-responsive output signals from sensors 11 and 12 are amplified at 13 and 14, respectively and the amplified signals are shaped at the respective wave shapers. The output signal forms from NAND-elements 19 and 20 are shown at c in FIG. 5, thus representing a series of perfectly shaped rectangular wave signals, respectively, which are then differentiated at the respective differentiating circuits, as shown by way of example at d, FIG. 5. The outputs from NAND-element 31 and 34 are shown representatively at e, FIG. 5.

It is now assumed that the signal output from the element 19 is of comparatively higher frequency one, while that delivered from another sensor 12 and thus from NAND-element 20 is of comparatively lower frequency one. Then, a pulse will appear at NAND-element 31 for each descending edge of the pulse signals at the output of the element 19 or instantly at each moment when the pulse from the latter terminates by conversion from H to L (refer to (3), (4) and (c) in FIG. 2). In the similar way, a pulse will appear at the output of NAND-element 34 when a signal pulse from NAND-element 20 will terminate at its descending edge. Refer to 1, 2 and d of FIG. 2.

The output signal from NAND-element 37 will be L when the both output signals from NAND-elements 31 and 34 are at H. When either one of the output signals from NAND-elements 31 and 34 converts in its state from H to L, then the output from NAND-element 37 will become H from L. Refer to 1, 2 and e of FIG. 2. Also, refer to 3, 4 and e and 5, 6 and e and further 7, 8 and e and so on. Therefore, it will be seen that the output will be a sum of the outputs from the elements 31 and 34.

The output from NAND-element 37 is reversed at 42 (refer to f in FIG. 2), and fed to the input of element 43.

By application of the output from NAND-element 34 (refer to 1, 2 and d in FIG. 2), the flip-flop 39 is reversed in its state, thus the output from element 34 being turned from H to L. Then, the output from element 41 will turn to H and the both input signals fed to element 40 will become H, thereby the output from the latter being turned to L. Then, the inputs to element 41 become all L and the output thereof is maintained at H, thereby the flip-flop circuit becoming stable.

Under these conditions, even when the output from NAND-element 34 turns from H to L, the flip-flop will not change its state.

Figure 2:
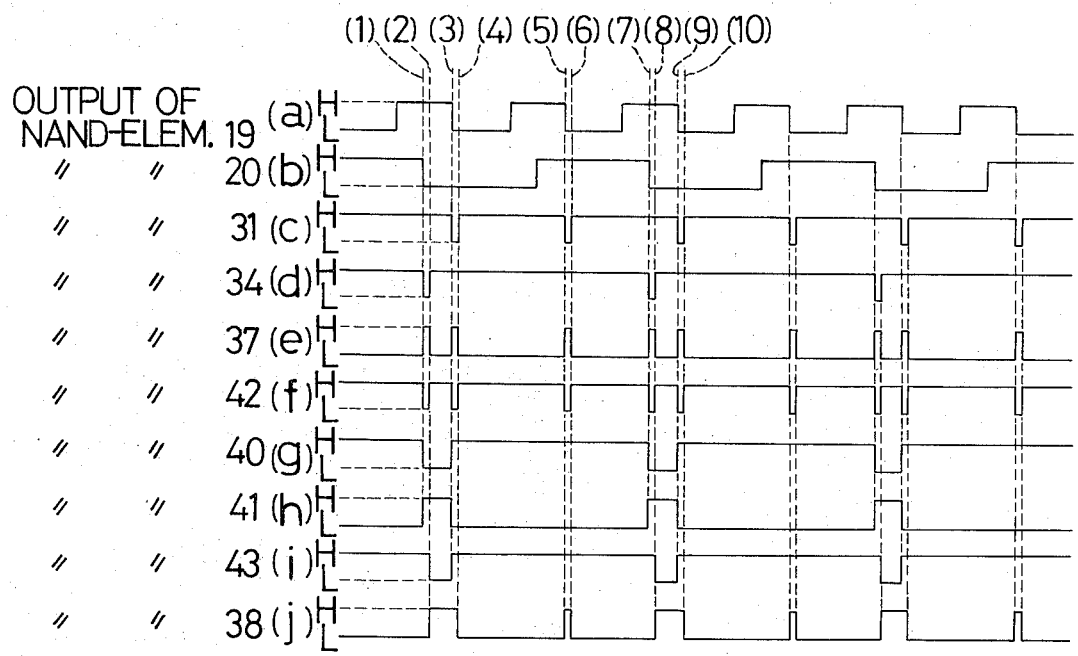

When the output from element 31 turns thereafter from H to L (refer to 3, 4 and c in FIG. 2), the output from NAND-element 40 of flip-flop 39 will turn from L to H, and since the output from element 34 remains at H (refer to 3, 4 and d in FIG. 2), the inputs to element 41 will become all H and thus, the output therefrom will become L (refer to 3 and h in FIG. 2). Thereafter, the flip-flop may maintain its stable, so far as the output from element 34 does not turn from H to L.

When the output from element 41 turns to L, and with the output from element 42 kept at L (refer to 3, 4 and f in FIG. 2), the inputs to element 43 will all become L and its output will turn from L to H (refer to 3 and i in FIG. 2). However, since one of the inputs to element 38 and the output from element 31 are all at L, then output from element 38 will remain at H (refer to 3 and j in FIG. 2).

When the output from element 41 turns to L, and since the output from element 42 remains at L (refer to 3, 4 and f in FIG. 2), the inputs to element 43 will turn all to L, and the output therefrom will turn from L to H (refer to 3 and i in FIG. 2). However, since one of the inputs to element 38 and thus the output from element 31 are all at L, the output from element 38 will remain at H as before (refer to 3 and j in FIG. 2).

When the instantaneous output from element 31 turns from L to H (refer to 4 and c in FIG. 2), both inputs to element 38 will become all H and the output thereof will turn to L (refer to 4, 5 and j in FIG. 2).

Next, when the output from NAND-element 31 turns from H to L (refer to 5 and c of FIG. 2) by the output from element 19 attributed to the higher speed or frequency signal, output from element 37 will turn to H and the L output from element 42 will be fed to the input of element 43, the flip-flop 39 being not turned in its state thereby. However, since both imputs to element 43 will become L, the inputs to element become H and L, respectively, thereby the output therefrom being turned to H (refer to 5, 6 and j of FIG. 2), and so on.

By repeating the aforementioned steps of operation, lower frequency signal pulses corresponding to those sensed at the lower speed sensor will be picked up at the outlet of element 41 and thus on the lead 45. Higher frequency signal pulses corresponding to those sensed at the higher speed sensor will be picked up at the output of element 38 and thus on the lead 44.

Or conversely, when output from sensor 11 and thus, that from element 19 is of the lower frequency nature, and the output from sensor 12 and thus that from element 20, is of the higher requency nature, the respective and processed pulse will be as shown in FIG. 3. By consulting with FIG. 3 in combination with the foregoing operational description, any reader can well understood the operational mode in this specific example. Therefore, it would not be necessary to continue a further detailed analysis thereof for understanding of the invention.

In the following, a further embodiment of the invention as applied to an automotive antiskid brake control mechanism will be described by referring to FIG. 6.

In this embodiment, leads 44 and 45 are of the similar nature of those denoted with 44 and 45 in the foregoing embodiment in such that the lead 44 is supplied always with the higher frequency input.

Lead 44 is connected with the triger terminal T of a flip-flop 101, Q-terminal of which is connected with trigger terminal T of flip-flop 102 and with an input of NAND-element 103. Q-terminal of flip-flop 101 is connetced with an input of NAND-element 104. Q-terminal of flip-flop 102 is connected with trigger terminal T of flip-flop 105, while Q̄-terminal is connected with respective inputs of NAND-elements 103, 104 and 106.

Q-terminal of flip-flop 105 is connected with trigger terminal T of flip-flop 107, while another Q̄-terminal is connected with respective inputs of NAND-elements 103, 104 and 106. Flip-flop 101, 102, 105 and 107 constitute in combination a first counter, as will become more apparent as the description proceeds.

Q̄-terminal of said flip-flop 107 is connected with respective inputs of NAND-elements 103, 104 and 106. Output of NAND-element 104 is connected with trigger terminal T of flip-flop 108, and output of NAND-element 103 is connected respective reset terminals R of flip-flops 109, 110, 111 and 112 which constitute in combination a second counter.

Output of NAND-element 106 is connected with an input of NAND-element 113. The other input of the latter is connected with lead 45. Output of NAND-element 113 is connected with trigger terminal T of flip-flop 109. Q-terminal of the latter is connected with trigger terminal T of flip-flop 110 and Q-terminal of this flip-flop 110 is connected with trigger terminal T of flip-flop 111, Q-terminal of the latter being connected with trigger terminal T of flip-flop 112, and with an input of NAND-element 114.

Q-terminal of flip-flop 112 is connected to the other input of NAND-element 114, the output of the latter being connected with a terminal of flip-flop 108. Q-terminal of the latter is connected through resistor 115 to the base of transistor 116, and with one of inlet of NAND-element 117. The collector of transistor 116 is connected through resistor 118 to the source voltage, and through resistor 119 to the base of transistor 120 which is connected with an earth conductor 121. Emitter of transistor 120 is connected with the source voltage, while the collector terminal of the same transistor is connected with a solenoid coil 122 which is arranged to actuate a valve adapted for increase or decrease of hydraulic pressure of an automotive vehicle braking system, not shown. This arrangement is designed and arranged in such way that with energization of solenoid coil 122, the valve is actuated so as to reduce the hydraulic brake pressure and on the contrary, with de-energization of the solenoid, the brake pressure is increased.

Q̄-terminal of flip-flop 108 is connected with an input of NAND-element 123, the output of the latter being connected through condenser 124 to NAND-element 125 and resistor 126 earthed.

Output of NAND-element 125 is connected with the other input of NAND-element 117, and with the other input of NAND-element 123.

Output of NAND-element 117 is connected with reset terminal R of flip-flop 108. NAND-elements 123 and 125, condenser 124 and resistor 126 consist in combination a mono-stable multivibrator.

Figures 6, 7, 9:
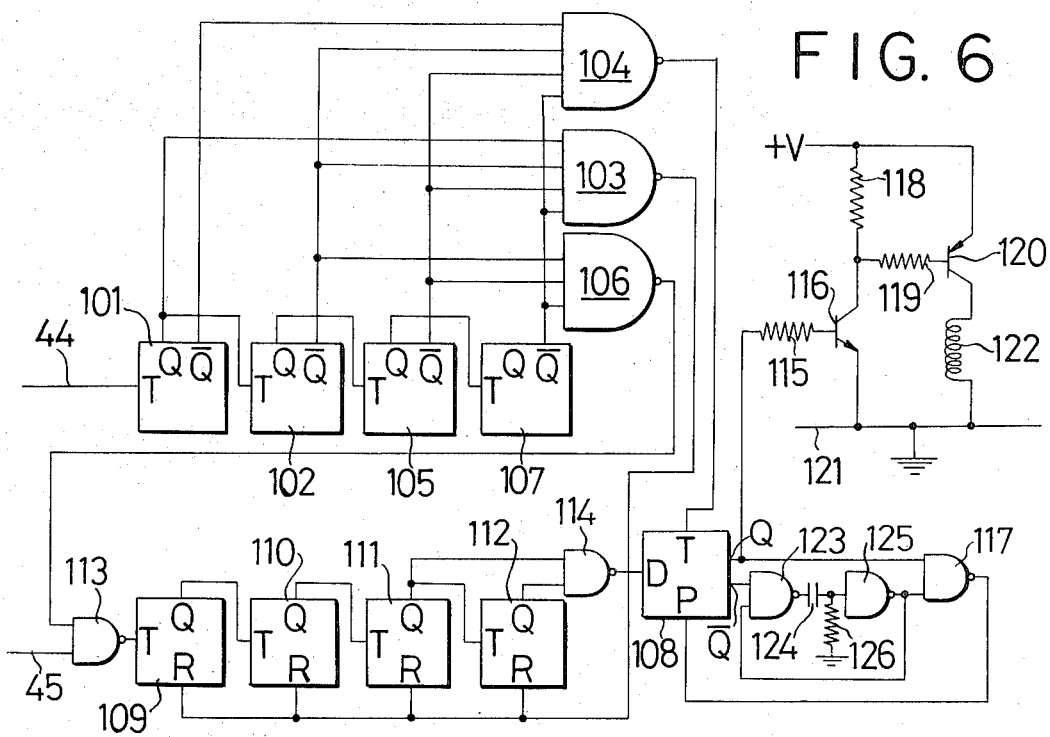
FIG. 6 is a circuit diagram showing an embodiment wherein the principles of the invention has been applied to an automotive antiskid brake control device.
FIG. 7 is a table showing for illustrating the operation of a first counter shown in FIG. 6.
FIG. 9 is a table showing the working mode of several main constituents included in a second counter shown in FIG. 6.

The operation of the embodiment shown in FIG. 6 is as follows:

In this embodiment, the first counter comprising flip-flops 101, 102, 105 and 107 is arranged to count the numer of pulses responsive to the rear of the vehicle having the higher speed.

Figures 8, 11:
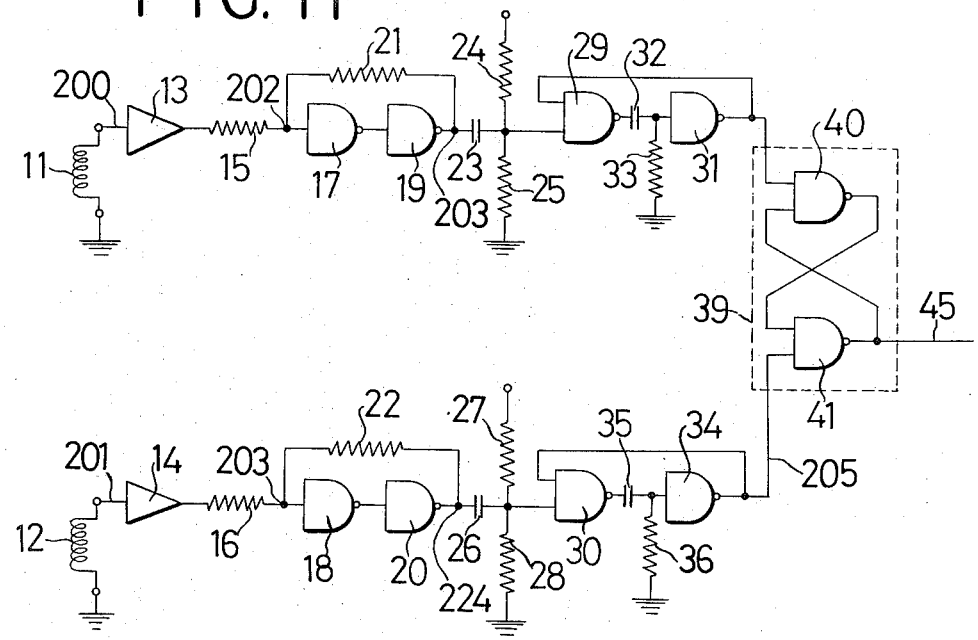
FIG. 8 is an explanatory table showing the working modes of several NAND-elements employed in the arrangement shown in FIG. 6.
FIG. 11 is a further schematic circuit diagram embodying again the principles of the invention.

It will therefore be seen as from FIG. 8 that the output from NAND-element 104 is L at 0-th signal and the output from NAND-element 103 is L at 1st signal. The outputs from NAND-element 106 will be H at 2nd–15th signals.

Sensed and shaped signals responsive to lower revolutional speed of one of the automotive rear wheels and appearing on the lead 45 are counted at the second counter comprising flip-flops 109-112 as shown in FIG. 9, when the output from NAND-signal is at H.

Outputs from NAND-element 114 will be H for 0–11th signals at the second counter and be L for 12–15th signals.

With the output from NAND-element 103 being L, the second counter is reset and the operational conditions will become back to those for 0-th signal.

With the output from NAND-element 104 being L, output from NAND-element 114 connected with the D-terminal of flip-flop 108 will appear as the output at the Q-terminal. As an example, when the output from NAND-element 114 is H, the Q-terminal of flip-flop 108 will be at H and vice versa. With the output from NAND-element 204 being at H, the output will be unchanged as for the output from the same element 104 being at L.

When the output at the Q-terminal of flip-flop 108 is at H, transistor 116 and 120 become conductive so that solenoid 122 is energized for reducing the hydraulic brake pressure in the brake system not shown. On the contrary, when the output at the Q-terminal of flip-flop 108 being at L, transistor 116 and 120 will become non-conductive so that solenoid coil 122 is de-energized for recovery of the hydraulic brake pressure.

When the state of H at the Q-terminal of flip-flop 108 is maintained, depend upon the operational modes of the mono-stable multivibrator and NAND-element 117, longer than the time period established by the mono-stable multivibrator, the flip-flop 108 is reset and the output therefrom at its Q-terminal is forcibly turned to L. By the high revolutional signal pulses sensed relative to the high speed one of the rear wheels and transmitted, upon processed in the foregoing way, to the first counter, the output from NAND-element 103 becomes L at arrival of the first pulse, so as to reset the second counter. During reception of signal pulses for fourteen counts ranging from the second to 15th count at the first counter, the lower revolutional signals for the remaining one of the rear wheels will be counted by the second counter. By the count of the first counter at 0-th signal pulse, the state of NAND-element 114 is memories at the Q-terminal of flip-flop 108. More specifically, when the second counter counts more than 12 counts of the lower revolutional rear wheel pulses during the period of counting at the first counter at which 14 counts have been made of the higher revolutional rear wheel signal pulses, NAND-element 114 will be turned to L and the Q-terminal thereof will be equally at L, while the Q-terminals of flip-flops 111 and 112 are kept at H, as will be clearly seen from FIG. 9.

The aforementioned L-state will then be maintained for recovery of the hydraulic brake pressure until a new information will have arrived at the first counter by counting a 0-th count again thereat.

On the contrary, when the second counter has counted 11 pulses or less than 11 pulses of the lower revolutional wheel signals during counting of 14 counts of the higher revolutional wheel signals at the first counter, NAND-element 114 will become the state of H and the Q-terminal of flip-flop 108 is kept also at H so as to maintain the state of H for reducing the hydraulic brake pressure, until the first counter will count a next 0-th pulse for introducing a new information.

Should the pressure-reducing period continue longer than the established period by the mono-stable multivibrator (metastable period), flip-flop 108 is caused to reset and the hydraulic brake pressure is forcibly increased in its recovering sense.

Therefore, it will be seen that in case of the automotive vehicle kept at its stopped conditions or directly therebefore, a brake pressure-restoration signal will develop without fail, so as to avoid a non-braking condition of the braking system.

In the foregoing embodiment, the ratio of the lower revolutional signal counts to the higher revolutional signal counts has been set to 12/14 or larger for issuing a pressure recovery instruction signal, while a pressure reduction instruction signal is delivered when the ratio becomes equal to 11/14 or less. It should be noted, however, these specific values of the ratio are only of the illustrating nature and can be modified depending upon the types and models of the vehicle, expected conditions in the use thereof, and the like.

Finally, a modified embodiment from that shown in FIG. 1 will be described by reference to FIG. 11. In this modification, same or similar constituents as before are illustrated with respective same numerals for easy comparison and for better understanding of the invention.

In this modification, the output of NAND-element 31 is connected solely with NAND-element 40 of flip-flop 39, other NAND-elements 37, 38, 42 and 43 have been dispensed with. With this modified arrangement, only one of the two rotating members at which a lower rotational speed is being developed, can be sensed. The operation may easily be understood by omitting the operations of NAND-elements 37, 38, 42 and 43 the output signal from the element 41 always responsive to the lower speed appearing at the lead 45.

When it is desired to sense the higher frequency information only, it suffices to cut out the lead 45 at the junction 70 so as to dispense with the down stream part of the whole circuit shown in FIG. 1.

It should be mentioned that either of the two rotating members has a lower or a higher rotational speed and which level the occasional speed attains are of very importance for the antiskid brake control mechanism or the like. As an example, in the case of the antiskid brake system for a four-wheel driven automotive vehicle, the lower speeded one of the rear wheels must be selected to be braked one, from the view point of braking safety, while in the case of the front wheels, the faster travelling one of them must be considered as the braking object from the view point of attaining a shortest possible braking distance of the vehicle. In such cases, the present invention may take an important role in the progressive art.

The embodiments of the invention in which an exclusive property or privilege is claimed are as follows:

1. A method for discriminating between lower and higher revolving states of a plurality of rotating members, comprising in combination:

sensing the rotational condition of one of said rotating members for delivery of a first series pulses in response thereto, sensing the rotational condition of the other of said rotating members for delivery of a second series of signal pulses in response thereto and generating a first series of output pulses each upon sensing an edge of the signal pulse belonging to said second series exclusively after sensing an edge of the signal pulse belonging to said first series, and generating a second series of output pulses consisting of said first series of output pulses added with additional pulses generated at each leading or trailing edge of the remaining said first or second series of signal pulses, thereby discriminating the higher revolving state of one of said rotating members from the lower revolving state of the other of said members.

2. A system for discriminating between lower and higher revolving states of a plurality of rotating members, comprising in combination, first and second sensor means for sensing respective rotational speeds of a pair of said rotating members and generating a respective series of signal pulses responsive thereto, first and second wave shaper circuits connected respectively with said first and second sensor means for shaping said respective output signal pulses, first and second differential circuits connected respectively with said first and second shaper circuits for differentiating output signal pulses therefrom, flip-flop circuit means connected respectively with said first and second differentail circuit means for delivery of an output signal pulse exclusively upon generation of an output signal pulse by one of said differentiating circuit means after issuance of an output signal pulse from the remaining differentiating circuit means, a first gate connected to receive respective output signals from said both differential circuit means, a second gate connected to receive the output signal from said first gate and that from said flip-flop circuit means, and a third gate connected to receive respective output signals from said first differentiating circuit means and from said second gate, thereby delivering an output signal responsive to the rotational state of the higher revolving one of said members.

3. The system of claim 2, further comprising means for taking out said output signal pulse from said flip-flop circuit means as a function of the rotating state of the lower revolving one of said members.

4. The system of claim 2, further comprising a pair of monostable multivibrator circuits which are operatively connected respectively at one side with first and second differentiating circuit means, and respectively at the other side with said flip-flop circuit means and with said gate circuit.

5. A system for discriminating between lower and higher revolving states of a plurality of rotating members, comprising in combination, first and second sensor means for sensing respective rotational speeds of a pair of said rotating members and generating respective series of signal pulses responsive thereto, first and second wave shaper circuits connected respectively with said first and second sensor means, flip-flop circuit means for reception of respective output signal pulses from said first and second differentiating circuit means and for delivery of an output signal pulse responsive to the rotational state of the lower revolving one of said members, said delivered output signal being issued exclusively upon generation of an output signal pulse from one of said differentiating circuit means after issuance of an output signal pulse from the remaining differentiating circuit means, a first gate connected to receive respective output signals from said both differential circuit means, a second gate connected to receive the output signal from said first gate and that from said flip-flop circuit means, a third gate connected to receive respective output signals from said first differentiating circuit means and from said second gate, thereby delivering an output signal responsive to the rotational state of the higher revolving one of said members, a first counter circuit operatively connected with said gate circuit for counting revolutions per unit time of the higher revolving one of said members, a second counter circuit operatively connected with said first counter circuit and said flip-flop circuit, and adapted for counting revolutions per unit time of the lower revolving one of said members during counting of the revolutions by said first counter circuit, and a circuit for generating a hydraulic braking pressure control signal in response to the revolutions per unit time counted by said second counter circuit relative to the revolutions counted in said first counter circuit, and means for controlling hydraulic braking pressure in response to said control signal.

6. The system of claim 5, further comprising a circuit operatively connected with said hydraulic braking pressure control signal generating circuit and adapted to deliver an output signal when the hydraulic braking pressure reducing period becomes longer than a predetermined time period, said control signal generating circuit generating an instruction signal for restoration of the hydraulic braking pressure control signal in the rising sense.

* * * * *